(12) United States Patent
Dam et al.

(10) Patent No.: US 10,114,355 B2
(45) Date of Patent: Oct. 30, 2018

(54) TECHNIQUES FOR FACILITATING COMMUNICATION BETWEEN NETWORKED NODES

(71) Applicant: Ultra Electronics, Round Rock, TX (US)

(72) Inventors: Hai Thanh Dam, Austin, TX (US); Daniel Lee McLaughlin, Austin, TX (US); Nick Verlenich, Austin, TX (US)

(73) Assignee: ULTRA ELECTRONICS, Round Rock, TX (US)

( * ) Notice: Subject to any disclaimer, the term of this patent is extended or adjusted under 35 U.S.C. 154(b) by 820 days.

(21) Appl. No.: 14/600,622

(22) Filed: Jan. 20, 2015

(65) Prior Publication Data
US 2016/0212199 A1 Jul. 21, 2016

(51) Int. Cl.
*H04L 12/28* (2006.01)
*G05B 19/042* (2006.01)
*H04L 12/933* (2013.01)
*H04L 12/935* (2013.01)
*H04L 12/42* (2006.01)

(52) U.S. Cl.
CPC .......... *G05B 19/0423* (2013.01); *H04L 12/42* (2013.01); *H04L 49/15* (2013.01); *H04L 49/30* (2013.01); *G05B 2219/25022* (2013.01)

(58) Field of Classification Search
None
See application file for complete search history.

(56) References Cited

U.S. PATENT DOCUMENTS

| 5,581,541 | A | * | 12/1996 | Whetsel | G01R 31/318536 |
| | | | | | 370/241 |
| 6,088,726 | A | * | 7/2000 | Watanabe | H04L 12/42 |
| | | | | | 709/220 |
| 6,778,557 | B1 | | 8/2004 | Yuki et al. | |
| 6,999,460 | B1 | * | 2/2006 | Fiore | H04L 45/00 |
| | | | | | 370/400 |

(Continued)

FOREIGN PATENT DOCUMENTS

| JP | 5509733 B2 | 6/2014 |
| WO | 2013147807 A1 | 10/2013 |

*Primary Examiner* — Bob A Phunkulh
(74) *Attorney, Agent, or Firm* — Brian F. Russell; Russell Ng PLLC

(57) ABSTRACT

A technique for operating a communication system includes determining whether a specific node of the communication system is a start node. In response to determining the specific node is the start node, transmission of a header over a communication link of the communication system for each frame period is initiated. The frame period also includes a plurality of address segments each of which has an associated data number. In response to determining the specific node is the start node, data numbers for address segments are compared with associated I/O module address settings to determine if a data number is equal to one of the associated I/O module address settings. In response to determining the data number is equal to one of the associated I/O module address settings, transmission of node configuration and data from an input module (included in associated I/O modules) or zeroes for an output module (included in the associated I/O modules) is initiated.

20 Claims, 14 Drawing Sheets

(56) References Cited

U.S. PATENT DOCUMENTS

| | | | |
|---|---|---|---|
| 7,206,877 B1* | 4/2007 | Doerenberg | H04L 67/12 |
| | | | 710/100 |
| 7,298,973 B2 | 11/2007 | Ovadia et al. | |
| 7,634,582 B2 | 12/2009 | Ovadia | |
| 7,921,323 B2 | 4/2011 | Yancey et al. | |
| 8,200,850 B2 | 6/2012 | Dam et al. | |
| 8,625,611 B2 | 1/2014 | Tse-Au | |
| 2007/0065078 A1* | 3/2007 | Jiang | H04L 12/2861 |
| | | | 385/76 |
| 2010/0020798 A1* | 1/2010 | Jones | H04L 12/413 |
| | | | 370/392 |
| 2010/0067408 A1* | 3/2010 | Kono | H04L 12/66 |
| | | | 370/276 |
| 2012/0263452 A1* | 10/2012 | Shirai | H04B 10/275 |
| | | | 398/3 |
| 2013/0010588 A1* | 1/2013 | Kretschmann | G05B 19/058 |
| | | | 370/218 |
| 2013/0182591 A1* | 7/2013 | Maruyama | H04L 43/0894 |
| | | | 370/252 |
| 2015/0095008 A1* | 4/2015 | Wang | G06F 11/3608 |
| | | | 703/20 |
| 2016/0226589 A1* | 8/2016 | Yan | H04Q 11/0066 |

* cited by examiner

Header

| Bit | Setting | Definition |
|---|---|---|
| 0 | 0 | Start Bit |
| 1 | 1/0 | Virtual Link Block/Virtual Link Unblock |
| 2 | 1/0 | Fiber Break/Fiber Heal |
| 3 | 1/0 | Global Alarm/No Alarm |
| 4-16 | NA | Reserved |
| 17 | 1 | Stop Bit |

*FIG. 5*

Data Sub-segment 1 – I/O Module Configuration 60

| Bit | Setting | Definition |
|---|---|---|
| 0 | 0 | Start Bit |
| 1-3 | 1 2 3<br>0 0 1<br>0 1 1<br>x x x | Input Module Configuration<br>Contact Closure Input Module<br>Analog Input Module<br>Reserved |
| 4 | 0/1 | Input/Output |
| 5 | 1/0 | Remote Input Address Setting<br>Error (Output waits for correction) |
| 6-16 | NA | Reserved |
| 17 | 1 | Stop Bit |

*FIG. 7*

Data Sub-segments 2-5

| Bit | Setting | Definition |
|---|---|---|
| 0 | 0 | Start Bit |
| 1-16 | X | I/O Data |
| 17 | 1 | Stop Bit |

*FIG. 8*

TECHNIQUES FOR FACILITATING COMMUNICATION BETWEEN NETWORKED NODES

This application claims the benefit of the filing date of U.S. Provisional Patent Application Ser. No. 61/929,332, entitled "METHOD, APPARATUS AND COMPUTER PROGRAM PRODUCT FOR MULTI-NODE RING MULTIPLEXER NETWORK COMMUNICATION", filed Jan. 20, 2014, the disclosure of which is hereby incorporated herein by reference in its entirety for all purposes.

BACKGROUND

This disclosure relates generally to communication and, more specifically, to techniques for facilitating communications between networked nodes (e.g., in an industrial control system).

Industrial control systems are used in industrial processes to control pressures, temperatures, mass transfers, electrical contact closures, and other process parameters. Control systems may include many input/output (I/O) devices (e.g., temperature sensors, pressure sensors, pressure regulators, electrical relay, and/or solenoid actuations, and other similar devices) positioned at various locations in process equipment being controlled. Modern process control systems may also include one or more programmable logic controllers (PLCs) for controlling various output devices in the system, based on data collected from input devices and based on instructions programmed into the PLCs.

Typically, I/O devices at one or more locations communicate with I/O devices at other locations in order for a control system to control a process. In particular, input devices in one location may transfer their data to output devices in one or more other locations to facilitate control of a process. In general, an industrial control system requires a data transfer arrangement to facilitate communication and data sharing between control system devices.

Some industrial processes may require very precise control. A communication failure between elements of an industrial control system may upset an entire process and have dire consequences. For example, failure of process control communications in a chemical manufacturing process may result in the production of an entirely different chemical than what was intended. In this case, a communications failure in an industrial control system may require that a process being controlled be aborted or at least suspended until communication is reestablished. Also, failure of communication and control in some processes may pose very serious safety risks. In general, communication systems employed in industrial control systems should be robust.

Data communication lines required between various elements of an industrial control system commonly traverses harsh environments or areas of high activity. In harsh environments and areas of high activity there is a constant danger of damage to data communication lines resulting in a loss of data communication in a control system. Also, conditions in some areas of an industrial process may interfere with certain types of transmissions. For example, electrical noise in certain areas of a plant may interfere with electrical signal transmissions.

To deal with electrical noise, data may be converted to optical signals for transmission between various input and output devices via optical fibers. Various nodes or locations in an industrial control network may be connected for data communication in a ring that allows communications in both directions around the ring with data shared at each node. In a closed ring configuration, a single break in a link between nodes of the ring does not cause a loss of data transfer since communication is still possible in the opposite direction from the link break location. However, a closed communication ring may suffer from continuous data repetition around the ring which interferes with new data transfer over the ring.

One way to solve the problem of ensuring communications in the event of a link failure between nodes along a communication pathway in an industrial process control system is to provide two communication pathways between the various nodes of the system. In the event of a failure on a primary communication pathway, communications may still be maintained along a secondary communication pathway. Since uncontrolled data messages in a multi-pathway network can give rise to repetitive circling of the same data around the ring (where new data is prevented from accessing the network), great care must be taken to prevent this situation.

Still further complications arise due to the nature of data communications in an industrial control system. While some communications of data may be relatively continuous in some process control applications, data communications may be infrequent in other systems. In situations in which long gaps appear between data, a communication failure may not be readily apparent. That is, a system that monitors for communication failures may mistake a communication fault for a gap in data or may mistake a gap in data for a communication fault. As such, detecting a failure in a communication process in an industrial control system may be difficult.

U.S. Pat. No. 6,307,652, which is hereby incorporated herein by reference in its entirety for all purposes, discloses a control unit that is included in a duplex optical communication ring that operates, at least in some respects, as a master unit to control aspects of communication within the ring. The control unit initially blocks data in both paths of the ring, i.e., in both transmit and receive directions of transmit and receive optical ports of the control unit. Data units are included in the ring and are operable both to interface respective control or data acquisition system devices to the ring and also to control aspects of communication within the ring, i.e., as slaves to the control unit in at least some respects. Responsive to detection of a break in a fiber link, the system moves the location of the blocking. That is, if a data unit detects a break, the data unit responsively blocks data at the location of the break and signals the master unit to stop blocking the passage of communications in an alternate pathway.

SUMMARY

A technique for operating a communication system includes determining whether a specific node of the communication system is a start node. In response to determining the specific node is the start node, transmission of a header over a communication link of the communication system for each frame period is initiated. The frame period also includes a plurality of address segments each of which has an associated data number. In response to determining the specific node is the start node, data numbers for address segments are compared with associated I/O module address settings to determine if a data number is equal to one of the associated I/O module address settings. In response to determining the data number is equal to one of the associated I/O module address settings, transmission of node configuration and data from an input module (included in associated I/O modules) or zeroes for an output module (included in the associated I/O modules) is initiated. In one or more embodiments, zeros are also transmitted for an empty frame when an error occurs.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 5 depicts a table that provides exemplary definitions for bits of an exemplary 18-bit header employed in the frame of FIG. 4, according to one aspect of the present disclosure.

FIG. 7 is a table that provides exemplary definitions for bits of an exemplary 18-bit first data sub-segment (i.e., data sub-segment 1) implemented in the address segment of FIG. 6, according an embodiment of the present disclosure.

FIG. 8 is a table that provides exemplary definitions for bits of exemplary 18-bit second through fifth data sub-segments (i.e., data sub-segments 2-5) implemented in the address segment of FIG. 6, according an embodiment of the present disclosure.

DETAILED DESCRIPTION

Figure 1:
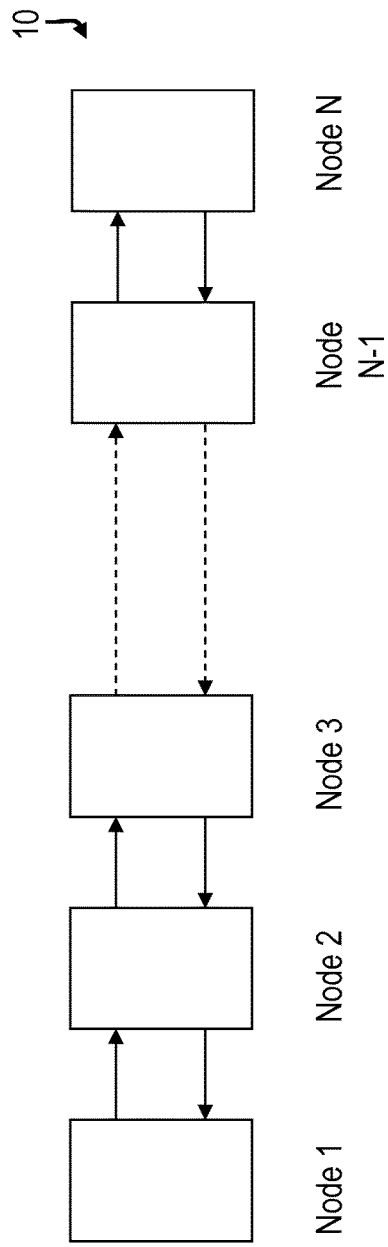
FIG. 1 is an exemplary block diagram of a relevant portion of a communication system with nodes (connected in a daisy-chain topology) that each include a communication base unit and may include one or more associated input/output (I/O) modules, according to an embodiment of the present disclosure.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. As may be used herein, the term 'coupled' may encompass a direct electrical connection between elements or components and an indirect electrical connection between elements or components achieved using one or more intervening elements or components.

According to one or more disclosed embodiments, a communication system may include multiple base units at various node locations that are coupled via optical fiber links that are formed into a communication ring. Each of the base units is operable to receive and transmit data to other base units and to associated input/output (I/O) modules. In one or more embodiments, a multi-node communication ring includes a first pathway for propagating a data stream (including control signals and data) between base units around the ring in a first pathway direction and a second pathway for propagating a data stream (including control signals and data) between base units around the ring in a second pathway direction.

In one or more embodiments, each of the base units is configured to send and receive data streams on each of the pathways and (responsive to receiving a predetermined initialization signal) to operate as a master for initially blocking data propagation in the first pathway and initially sending a block signal to a neighboring base unit downstream in the second pathway. The base units are operable, responsive to receiving the block signal in one of the pathways, to block data propagation in the blocked pathway to create an inactive virtual link to prevent data from propagating around the ring more than once.

In one embodiment, the base units send and receive the data as a data packet in the data stream pathways and the master sends the block signal with each data packet responsive to receiving a heal signal between data packets. The heal signal indicates no break has been detected in any location other than at the virtual link. The master is further operable to send an unblock signal in the second pathway responsive to receiving a break signal between data packets. In another embodiment, the unblock signal is included in a header. The break signal indicates a link break in a location other than at the virtual link. The base units are operable, responsive to receiving an unblock signal in one path, to stop blocking data in the one path. In another aspect, the non-master base units are further operable to respond to receiving a break signal by relaying the break signal around the ring to the master.

In another aspect, the base units are further operable to detect and respond to upstream link breaks. Responding to a link break in one pathway includes blocking data from the broken link, sending a break signal to a neighboring base unit downstream of the link break in the pathway, and sending a block signal to a neighboring base unit in the other pathway so that the base unit receiving the block signal from the break-detecting base unit blocks data in the other pathway. In this manner, the break signal is relayed to the master and the master and the neighboring base units downstream of the master in the second pathway change the virtual link to an active data transfer link to allow data to propagate around the ring in spite of the link break. In another aspect, the base units are operable to send the block signals as tags appended to the data packets. In one embodiment, the base units are operable to send and receive the break signals as a continuous carrier signal between packets.

In one embodiment, each base unit includes shift registers for each pathway and fault logic coupled to the respective shift registers. Each of the base units is operable to shift a received data stream through its respective shift register and the fault logic is operable to insert the break and block signals into the received data stream. In another aspect, each base unit is operable to repeatedly send heal codes to adjacent base units in the ring, except when sending data packets, so that the receiving base units can verify a communication link is intact.

In another embodiment, a method of communicating in a ring network includes an initializing step in which a first link in a first pathway of the ring is initialized to block data packet communication in order to prevent continuous propagation of the same data around the ring. The initializing includes a master base unit sending a block tag in a data packet on the link of the first pathway. The method further includes activating a link from a second pathway in the ring responsive to a break occurring in a second pathway link. The break in the second pathway link is non-adjacent to the master base unit and is instead between two adjacent communication base units. The break may be reported to the master base unit by a base unit communicating the break signal between data packets. In another embodiment, the break may be reported in a header. The master base unit activates the virtual link in response to the break signal, such that the virtual link provides data propagation and messages can still be delivered around the ring in spite of the break. In another aspect, the method includes deactivating the virtual link in response to detecting that the once broken link no longer has a break, and reporting the non-break in the second link to the master base unit by a base unit removing the break signal from between data packets. In another embodiment, a header is employed to report the non-break. In another aspect, the method includes deactivating the virtual link again by the master base unit responsive to the non-break report, so that the virtual link again prevents propagation of messages in the ring.

In another aspect, the ring includes a number of base units, each of which is capable of operation as the master base unit responsive to receiving a predetermined initialization signal. The initializing step includes initializing one of the base units to operate as the master base unit. Responsive to the initializing, the master base unit blocks data in a virtual link and initially sends a block signal to a neighboring base unit downstream in a second path of the virtual link. The base units, responsive to receiving the block signal in one of the paths, block data in that path, so that responsive to the initializing step the master and the neighboring base unit downstream initialize the first link as an inactive virtual link in order to prevent data from propagating around the ring more than once.

Processes, ports, and registers of the base units described herein may be implemented as programmable gate array logic or in other ways, including application specific integrated circuitry, one or more embedded controllers, etc.

The description of the present embodiment has been presented for purposes of illustration, but is not intended to be exhaustive or to limit the invention to the form disclosed. Many modifications and variations will be apparent to those of ordinary skill in the art. Moreover, the disclosed processes are capable of being distributed in the form of a computer-readable storage devices including instructions. Examples of computer-readable storage devices include recordable-type media such a floppy disc, a hard disk drive, a RAM, and CD-ROMs.

In a ring-configured network described herein, transmission paths between nodes have been described as being optical fiber paths. However, it should be understood that other transmission media may be employed, e.g., electrical transmission using coaxial cable or paired conductors or wireless transmission. Unless clearly and explicitly stated, the claims that follow are not intended to imply any particular sequence of actions. The inclusion of labels, such as a), b), c) etc., for portions of the claims does not, by itself, imply any particular sequence, but rather is merely to facilitate reference to the portions.

With reference to FIG. 1, an exemplary communication system 10 is illustrated that includes a number of nodes (labeled 'Node 1' through 'Node N') that communicate via a daisy-chain topology. In one or more embodiments, each of the nodes includes a communication base unit and may include one or more input/output (I/O) modules. It should be appreciated that communication system 10 may include any number of nodes. For example, communication system 10 may be configured in a two node physical arrangement. As one example, field sensor signals from devices (not shown) coupled to a first node (e.g., Node 1) via copper cables may be converted from electrical signals into multiplexed optical signals that are transmitted over an optical fiber (e.g., single mode or multi-mode) to a second node (e.g., Node 2), where the received optical signals are converted to electrical signals, de-multiplexed, and coupled to devices (not shown) that are coupled to the second node. For example, a field sensor signal may correspond to an analog DC current, an analog DC voltage, a contact closure, or an RS232/485 signal.

Figure 2:
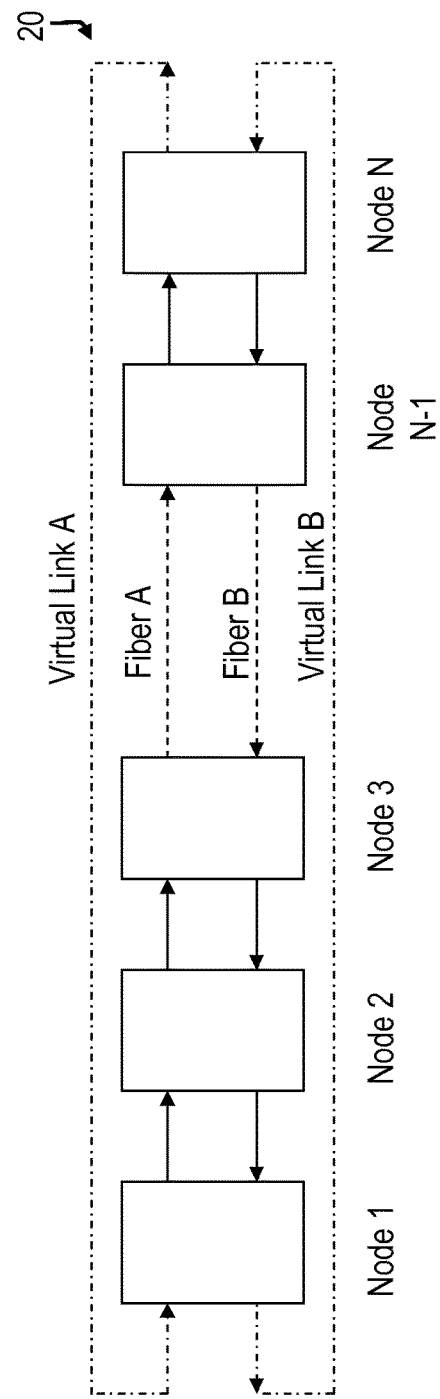
FIG. 2 is an exemplary block diagram of a relevant portion of a communication system with nodes (connected in a self-healing ring (SHR) topology) that each include a communication base unit and may include one or more associated I/O modules, according to an embodiment of the present disclosure.

With reference to FIG. 2, a communication system 20 is illustrated that includes nodes in a self-healing ring (SHR) topology. Each of the nodes includes a communication base unit and may include one or more I/O modules. The SHR topology facilitates uninterrupted data communication in the event of a failure in a communication pathway. In at least one embodiment, 'Node 1' and 'Node N' each include small form-factor pluggable (SFP) transceivers that are utilized to establish a virtual link (VL), used as a backup communication link when a fiber optic cable link (e.g., Fiber A or Fiber B) is broken. In one or more embodiments, an SHR controller turns off VL communication at a master base unit (e.g., Node N) until a "Fiber Break" signal is received from a slave base unit (e.g., at one of Nodes 1 through N−1). Upon receiving the break signal, the master turns on the VL to continue communication. When the master receives the heal signal from a slave base unit (indicating the broken link is repaired), the master turns off VL communication and communication system 20 resumes normal communication. For example, if a break occurs between Node 1 and Node 2, Node 1 may then communicate with Node 2 via Node N though Node 3.

Figure 3:
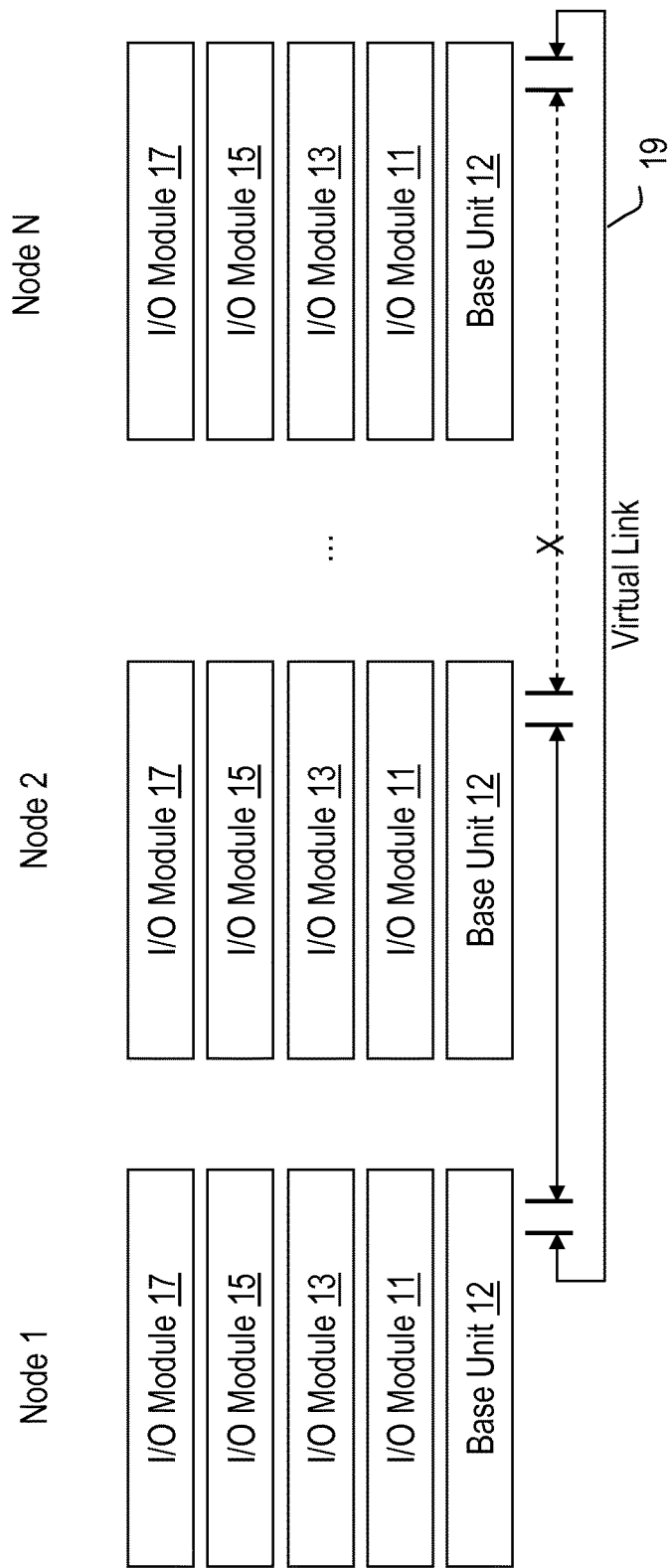
FIG. 3 illustrates the communication system of FIG. 2 in additional detail, where each node includes a base unit coupled to four I/O modules, according to an embodiment of the present disclosure.

With reference to FIG. 3, a relevant portion of communication system 20 of FIG. 2 is illustrated in additional detail. As is illustrated, Node 1 includes a base unit 12 that is coupled to four I/O modules 11, 13, 15, and 17. Similarly, Node 2 includes a base unit 12 that is coupled to four I/O modules 11, 13, 15, and 17. Node N, similarly, includes a base unit 12 that is coupled to four I/O modules 11, 13, 15, and 17. It should be appreciated that a base unit configured according to the present disclosure may have more or less than four associated I/O modules and the I/O modules associated with the different base units may be the same or different. As previously mentioned, when a link between nodes is broken, a VL may be employed to facilitate further communications between nodes. For example, VL 19 may be activated to facilitate communication between Node N and Node 1 when a normal link between Node 2 and Node N is broken.

A communication system configured according to one embodiment may send up to 1,024 channels of bi-directional information over a pair of fiber optic cables. In various embodiments, I/O modules may include, for example, analog 4-20 mA, analog 0-10 VDC, and contact closure/relay inputs. In various embodiments, a base unit connects directly to a fiber optic cable and may provide a visual indication of an optical fiber link status. In at least one embodiment, each base unit includes two duplex optical ports that are configured for use with 1310 nm or 1550 nm wavelength, multi-mode or single mode optical fibers. In one or more embodiments, each base unit includes an integrated backplane that allows for communications from the base unit to the I/O modules without an external wiring connection. In various embodiments, base units do not require programming and power is supplied through an external 24 VDC power supply.

According to aspects of the present disclosure, a communication network may be configured in multiple ways. For example, a communication network may have a point-to-point configuration, a multi-node input configuration, a multi-node output configuration, a multi-node I/O configuration, and/or a demultiplexer configuration. In the examples below, each base unit is assumed to be coupled to up to four I/O modules, each of which may have up to four channels. As one example, in a point-to-point configuration, up to sixteen (16) channels of one node may communicate with up to sixteen (16) channels of another node, when the nodes have matching module addresses. As another example, in a multi-node input configuration, sixteen (16) input channels associated with four nodes each having four input channels (at different locations) may communicate with sixteen (16) output channels of another node, when the nodes have matching I/O module addresses. As yet another example, in a multi-node output configuration, sixteen (16) input channels of a node may communicate with sixteen (16) output channels of four nodes each having four output channels (at different locations), when the nodes have matching module addresses.

According to another example, in a multi-node I/O configuration, four input channels from each of four nodes (at different locations) may communicate with four output channels at each of four nodes, when the nodes have matching module addresses. In other embodiments, the four outputs can be at either four different locations, the same location, or an infinite number of outputs using the same four input addresses may be implemented. In another example, in a demultiplexer configuration, a single input channel of a node may be de-multiplexed to five output channels at five nodes (at different locations) or a single input of a node may be de-multiplexed to sixteen output channels at another node, when the nodes have matching module addresses. It should be appreciated that the above described functions may be combined for a single network by employing output port mapping. In one embodiment, a maximum of 1,024 input channels (i.e., four input channels per address with two-hundred fifty-six addresses) may be implemented and the number of output channels is unlimited.

Figure 4:
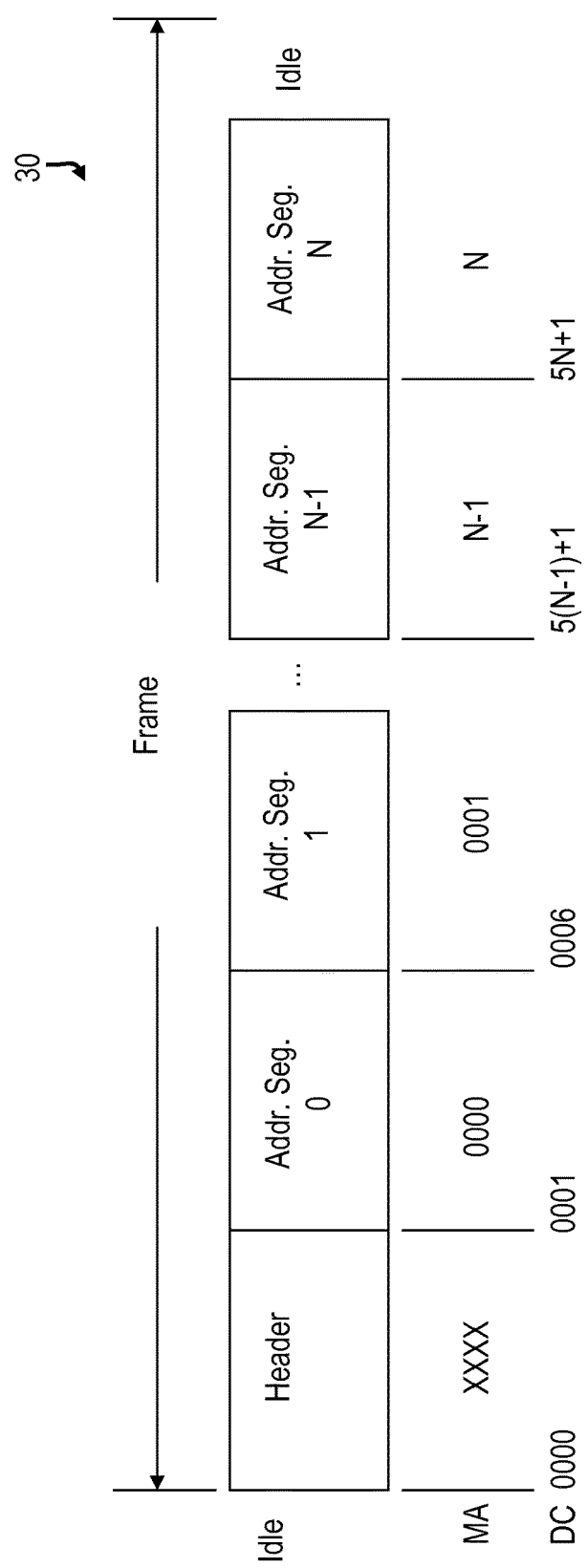
FIG. 4 is an exemplary diagram of a relevant portion of a packet frame employed in a communication system configured according to an embodiment of the present disclosure.

With reference to FIG. 4, an exemplary frame for a communication packet is illustrated according to one embodiment of the present disclosure. As is illustrated, a frame 30 include a header, followed by a number of address segments, followed by an idle time. For example, in a communication system that implements eight address bits, two-hundred fifty-six address segments are implemented (i.e., 'N' is equal to 255). In this case, two-hundred fifty-six different input modules may be addressed and each address segment has an associated module address (MA). For example, address segment zero (Addr. Seg. 0) corresponds to information for MA zero and address segment 'N' corresponds to information for MA 'N'. A data counter (DC) in each base unit counts data to determine a location in a frame. As is illustrated, at the end of the header, a DC is equal to one (1) and at the end of address segment zero, the DC is equal to six (6), as each address segment includes five 18-bit data sub-segments.

With reference to FIG. 5, a table 40 provides definitions for bits of an exemplary 18-bit header employed in frame 30 of FIG. 4. According to one embodiment, an idle time from end of a data packet to a next header includes twenty or more bits, all in a high state. In one embodiment, a header includes eighteen bits. Bit 0 of the header is a start bit, indicated by a zero state. Bit 1 of the header indicates a virtual link lock or unlock depending on state. Bit 2 of the header is associated with a fiber break. Bit 3 of the header is associated with a global alarm. Bits 4-16 of the header are reserved. Finally, bit 17 of the header is a stop bit, indicated by a one state.

Figure 6:
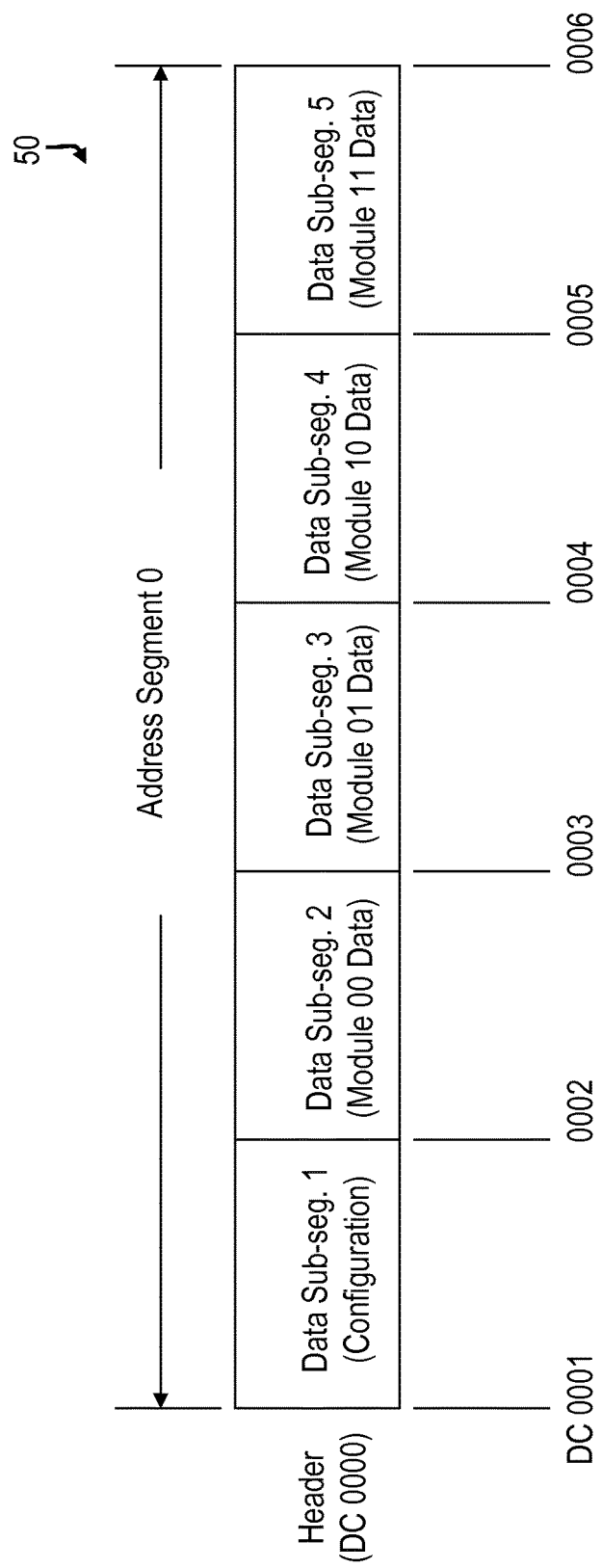
FIG. 6 illustrates an exemplary address segment (i.e., address segment 0), which includes five data sub-segments, according to one embodiment of the present disclosure.

With reference to FIG. 6, an exemplary address segment 50 includes five data sub-segments, according to one embodiment of the present disclosure. In at least one embodiment, each address segment 50 includes five 18-bit data sections (i.e., 'data sub-segment 1', 'data sub-segment 2', 'data sub-segment 3', 'data sub-segment 4', and 'data sub-segment 5'). With reference to FIG. 7, in one or more embodiments and as further illustrated in table 60, the 'data sub-segment 1' section is a module configuration section. Bit 0 of 'data sub-segment 1' corresponds to a start bit (i.e., a zero). Bits 1-3 of 'data sub-segment 1' correspond to input module configuration bits. Bit 4 of 'data sub-segment 1' indicates an input or an output ('1' for output and '0' for input). Bit 5 of 'data sub-segment 1' is associated with a remote error. In particular, the remote error may be a remote address setting error, where two input modules are set to the same module address, but attached to two separate nodes. Bits 6-16 of 'data sub-segment 1' are reserved and bit 17 of 'data sub-segment 1' corresponds to a stop bit (i.e., a one).

With reference to FIG. 8, in one or more embodiments and as further illustrated in table 70, the data sub-segments 2-5 are associated with channels 1-4, respectively, of a same I/O module. Bit 0 of the data sub-segments 2-5 corresponds to a start bit (i.e., a zero). Bits 1-16 of the data sub-segments 2-5 correspond to data bits and bit 17 of the data sub-segments 2-5 correspond to a stop bit (i.e., a one). In one embodiment, each node (location) may include up to four I/O modules, with each input module having a different address setting. It should be appreciated that a node may have more or less than four I/O modules depending on the application. In one embodiment each I/O module has four input or four output ports. It should be appreciated that an I/O module may have more or less than four ports depending on the application. In one or more embodiments, when a node does not have an associated I/O module, the node functions as a repeater. In various embodiments, I/O modules of a node may communicate locally with one another.

Figure 9:
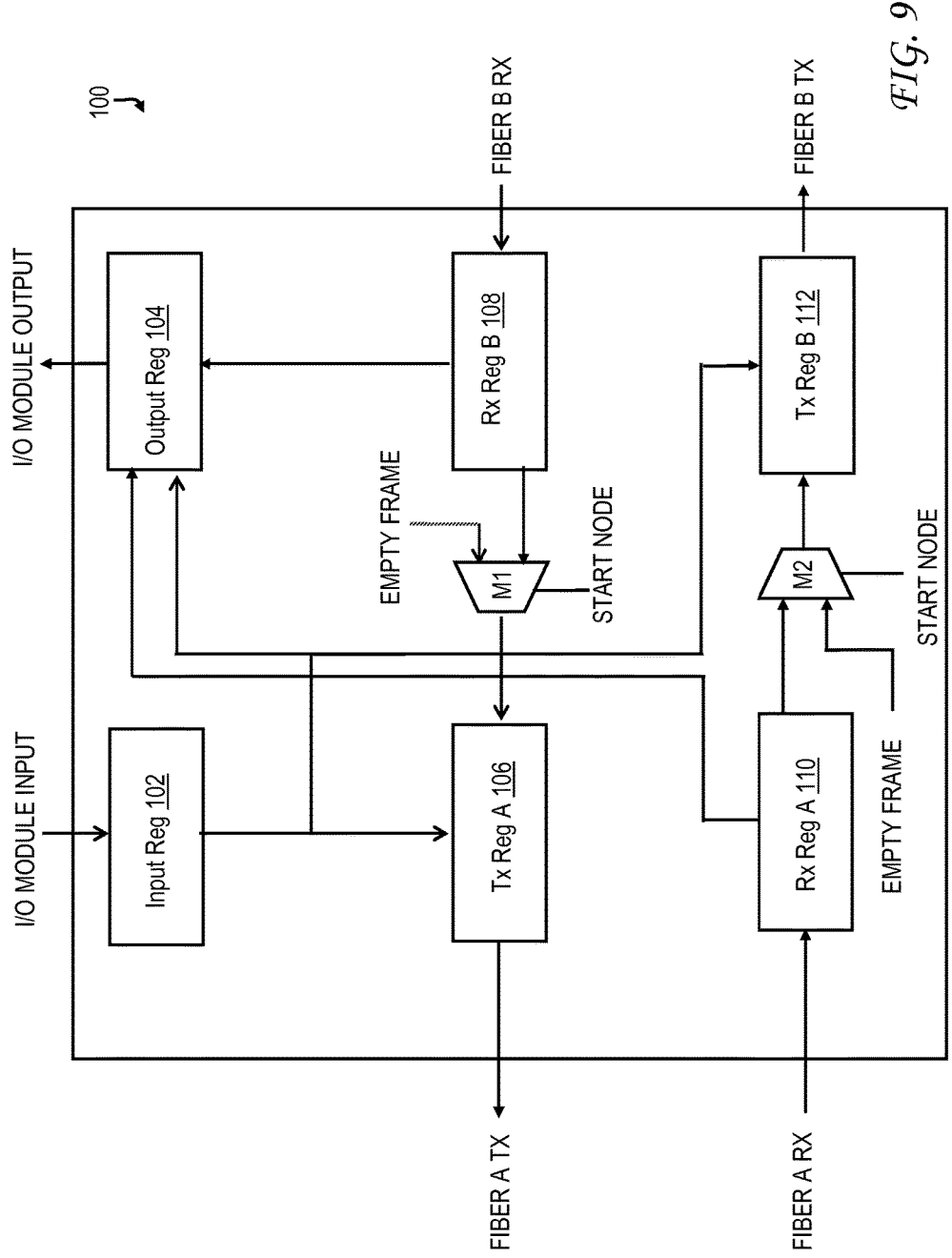
FIG. 9 is a diagram that depicts a relevant portion of an exemplary base unit configured according to an embodiment of the present disclosure.

With reference to FIG. 9, a portion of an exemplary base unit 100 is illustrated that is configured according to an embodiment of the present disclosure. Base unit 100 includes a receive register (Rx Reg A) 110 that is utilized to temporarily store data received from a first fiber (Fiber A) and a receive register (Rx Reg B) 108 that is utilized to temporarily store data received from a second fiber (Fiber B). Base unit 100 also includes a transmit register (Tx Reg A) 106 that is utilized to temporarily store data that is to be transmitted over the first fiber (Fiber A) and a transmit register (Tx Reg B) 112 that is utilized to temporarily store data that is to be transmitted over the second fiber (Fiber B).

Input register (Input Reg) 102 is coupled to transmit register (Tx Reg A) 106, transmit register (Tx Reg B) 112, and output register (Output Reg) 104, such that input register (Input Reg) 102 can transfer input data to Fiber A, Fiber B, or a connected output module. Output register (Output Reg) 104 is also coupled to receive register (Rx Reg A) 110 and receive register (Rx Reg B) 108, such that output register (Output Reg) 104 can receive data from either Fiber A or Fiber B. Multiplexers M1 and M2 allow base unit 100 to provide an empty frame (when functioning as a start node) or receive data for processing or transfer. An empty frame is a frame with no header, configuration information, or data. In one or more embodiments, whichever node in a ring recognizes a fiber break becomes the start node. For example, each network may have two start nodes (upstream/downstream), which are the nodes on either end of a virtual link, a fiber break, or a daisy-chain configuration.

Figure 10:
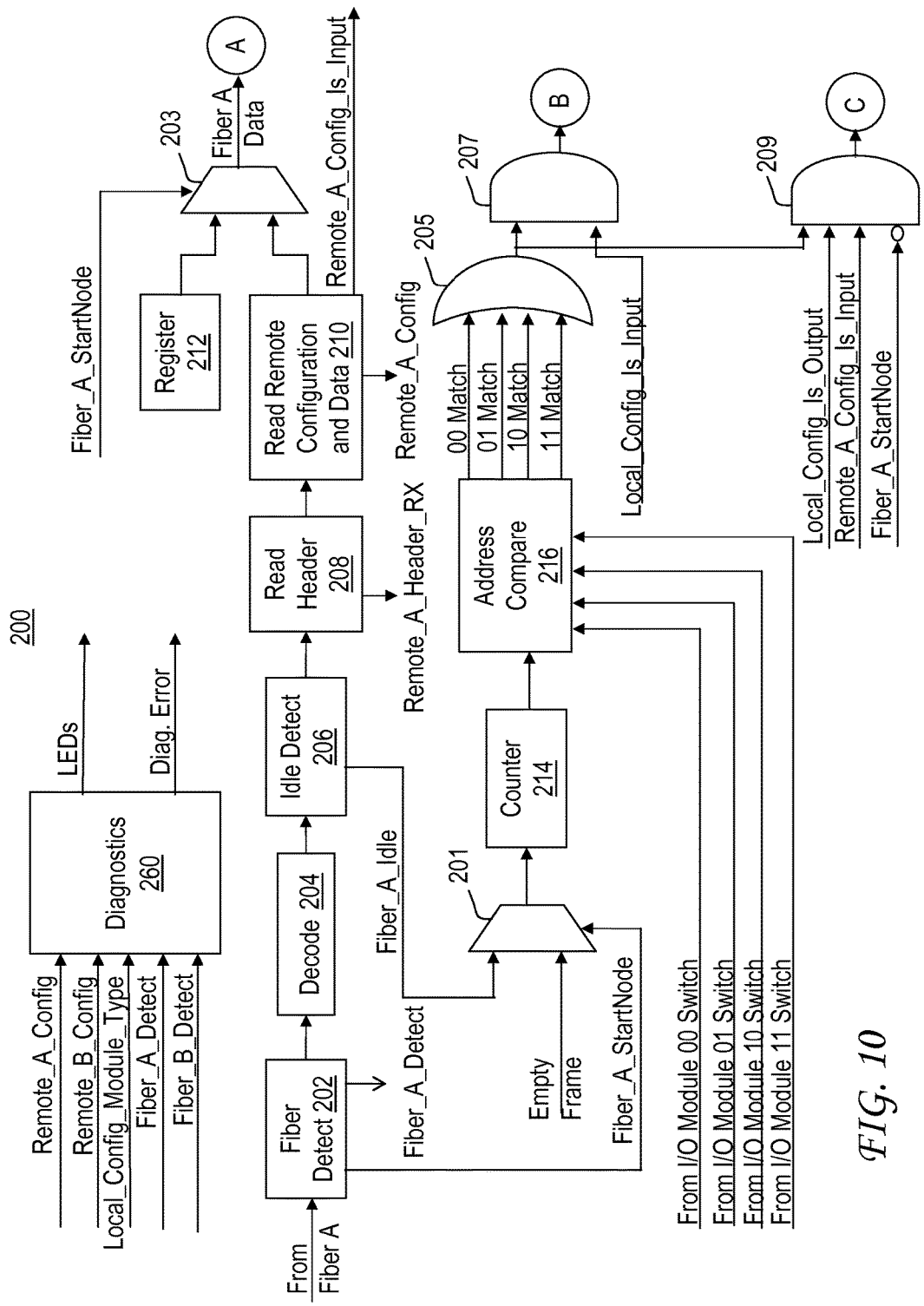
FIGS. 10-12 depict a block diagram of a relevant portion of the exemplary base unit of FIG. 9 in additional detail.
Figure 11:
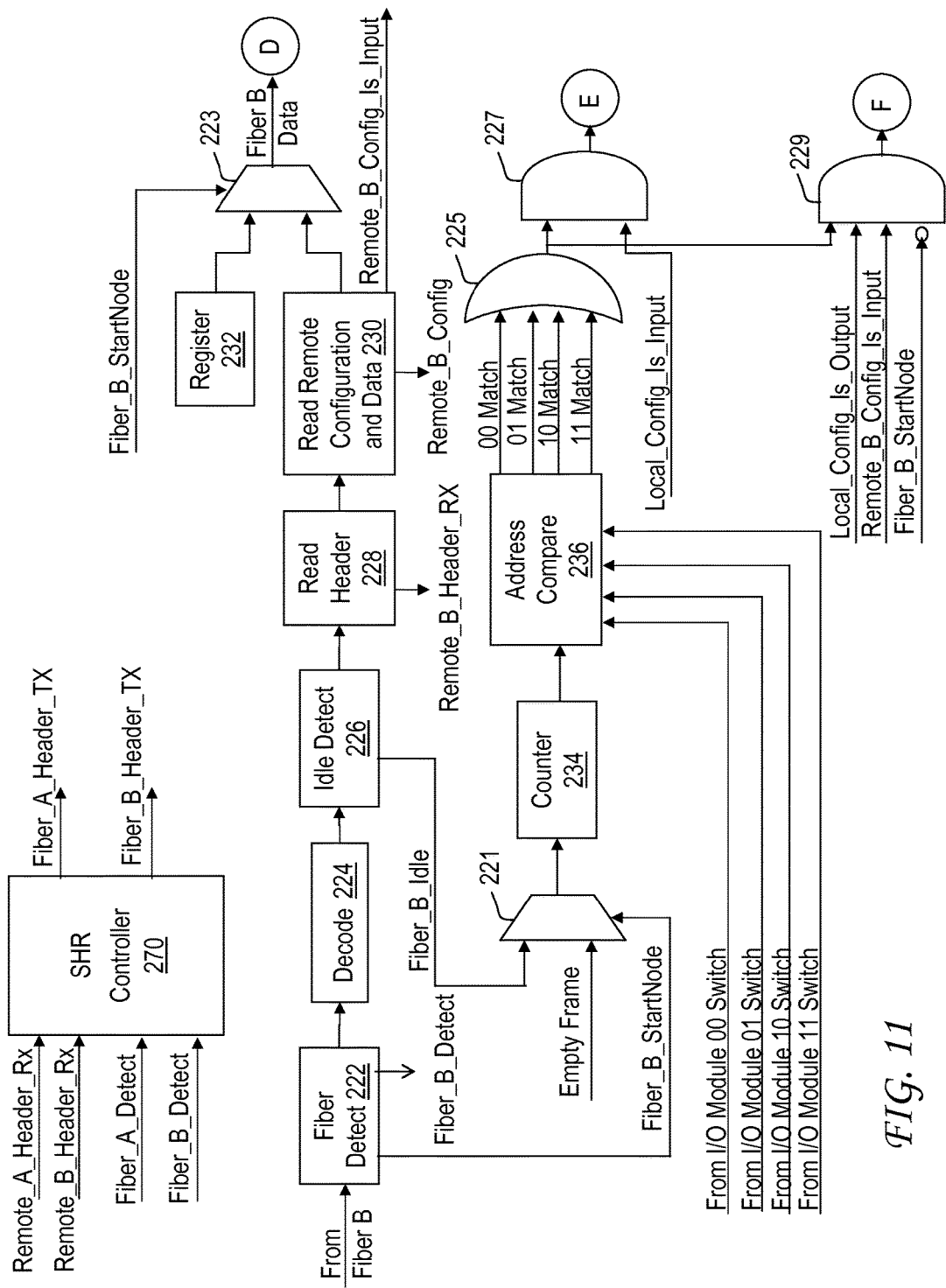
Figure 12:
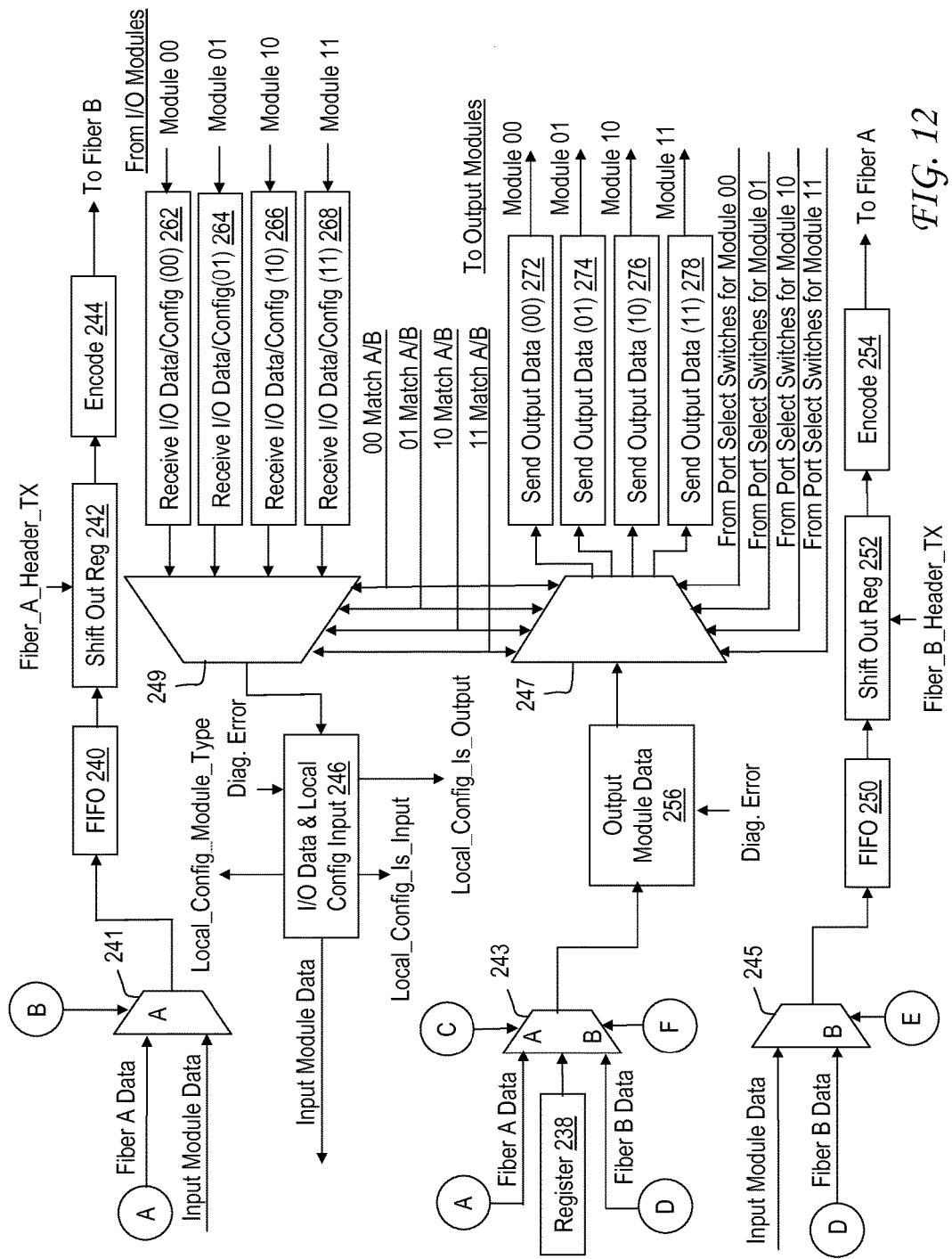

With reference to FIGS. 10-12, an exemplary base unit 200 is illustrated in additional detail. With specific reference to FIG. 10, a first optical fiber (Fiber A) is coupled to an input of a fiber detect block 202. Fiber detect block 202 provides a Fiber A detect signal (Fiber_A_Detect) indicating whether a signal is detected on Fiber A and a Fiber A start node signal (Fiber_A_StartNode) indicating whether base unit 200 is a start node. An output of block 202 is coupled to an input of decode block 204, which may, for example, perform Manchester decoding. An output of block 204 is coupled to an input of idle detect block 206, which may be configured to detect a 20-bit string of ones that indicates an idle period (at an end of a frame before a next header).

A first output of block 206 generates an idle signal (Fiber_A_Idle) indicating whether an idle period has been detected. A second output of block 206 is coupled to an input of read header block 208, which outputs a header (Remote_A_Header_Rx) of a received frame. In one or more embodiments, a node becomes a start node when a transceiver port does not detect a fiber signal at a receiver. If the receiver of transceiver A detects no signal, the transmitter of transceiver B starts transmitting a start pulse or an empty frame. If a receiver of transceiver B detects no signal, a transmitter of transceiver A starts transmitting a start pulse or an empty frame. In one or more embodiments, three conditions may cause creation of a start node: a fiber break, activation of a virtual link, or an unplugged SFP (for a communication system having daisy-chain topology).

An output of block 208 is coupled to an input of a read remote configuration and data block 210. Block 210 generates a first signal (Remote_A_Config) and a second signal (Remote_A_Config_Is_Input), which provide an indication of whether configuration data is remote and whether remote configuration data is input data, respectively. A first output of block 210 is coupled to a first input of multiplexer 203. A second input of multiplexer 203 is coupled to an output of register 212, which is loaded with zeroes that are provided at an output of multiplexer 203 based on a select signal (Fiber_A_StartNode) that is coupled to a select input of multiplexer 203. That is, an output of multiplexer 203 provides either Fiber A data or zeroes responsive to the Fiber_A_StartNode signal. In one or more embodiments, the Fiber_A_Detect signal may be used for controlling diagnostic LEDs, a break/heal function of a self-healing ring (SHR), and to indicate a loss-of-light (i.e., detection of no light on the fiber). Multiplexer 201 receives the Fiber_A_Idle signal at a first input and an empty frame signal at a second input. The Fiber_A_StartNode signal functions as a select signal for multiplexer 201.

An output of multiplexer 201 is coupled to an input of counter 214. Multiplexer 201 provides a reset and start counter signal responsive to a condition of the Fiber_A_StartNode signal. If the Fiber_A_StartNode signal is true, an empty frame is sent to counter 214. If the Fiber_A_StartNode signal is false, an idle signal is sent to counter 214. In one embodiment, counter 214 is incremented by one for each eighteen bits. For example, for a frame that includes an 18-bit header and two-hundred fifty-six address segments (each including five 18-bit data sub-segments) counter 214 will reach a terminal count of 1281 before being reset for a next frame. An output of counter 214 is coupled to an input of address compare block 216, which compares addresses of associated I/O modules (e.g., set by switches on the I/O modules or by software) to determine whether an address match occurs. For example, assuming four I/O modules with different addresses are attached to base unit 200, then four address segments should match the addresses of the four I/O modules.

Respective outputs of block 216 are coupled to respective inputs of OR gate 205. An output of OR gate 205 is coupled to a first input of AND gate 207 and is at a high state when an address match occurs. A second input of AND gate 207 receives a local configuration signal (Local_Config_Is_Input), which indicates whether a local I/O module is configured as an input. The output of OR gate 205 is also coupled to a first input of AND gate 209. A second input of AND gate 209 receives a local configuration signal (Local_Config_Is_Output), which indicates whether a local I/O module is configured as an output. A third input of AND gate 209 receives a remote configuration signal (Remote_A_Config_Is_Input), which indicates whether a remote I/O module is providing the input. A fourth input of AND gate 209 receives the Fiber A start node signal (Fiber_A_StartNode).

With specific reference to FIG. 11, a second optical fiber (Fiber B) is coupled to an input of a fiber detect block 222. Fiber detect block 222 provides a Fiber B detect signal (Fiber_B_Detect) indicating whether a signal is detected on Fiber B and a Fiber B start node signal (Fiber_B_StartNode) indicating whether base unit 200 is a start node. An output of block 222 is coupled to an input of decode block 224, which may, for example, perform Manchester decoding. An output of block 224 is coupled to an input of idle detect block 226, which may be configured to detect a 20-bit string of ones that indicates an idle period (at an end of a frame before a next header). A first output of block 226 generates an idle signal (Fiber_B_Idle), which indicates whether an idle period has been detected. A second output of block 226 is coupled to an input of read header block 228, which outputs a header (Remote_B_Header_Rx) of a received frame. An output of read header block 228 is coupled to an input of a read remote configuration and data block 230.

Block 230 generates a first signal (Remote_B_Config) and a second signal (Remote_B_Config_Is_Input). A first output of block 230 is coupled to a first input of multiplexer 223. A second input of multiplexer 223 is coupled to an output of register 232, which is loaded with zeroes that are provided at an output of multiplexer 223 based on a select signal (Fiber_B_StartNode) coupled to a select input of multiplexer 223. That is, an output of multiplexer 223 provides either Fiber B data or zeroes responsive to the Fiber_B_StartNode signal. Multiplexer 221 receives the Fiber_B_Idle signal at a first input and a frame signal at a second input. The Fiber_B_StartNode signal functions as a select signal for multiplexer 221.

Multiplexer 221 provides a reset and start counter signal responsive to the condition of Fiber_B_StartNode signal. If the Fiber_B_StartNode signal is true, an empty frame is sent to the counter. If the Fiber_B_StartNode signal is false, an idle signal is sent to the counter. An output of multiplexer 221 is coupled to an input of counter 234. In one embodiment, counter 234 is incremented by one for each eighteen bits. For example, for a frame that includes an 18-bit header and two-hundred fifty-six address segments (each including five 18-bit data sub-segments) counter 234 will reach a terminal count of 1281 before being reset for a next frame.

An output of counter 234 is coupled to an input of address compare block 236, which compares addresses of associated I/O modules (e.g., set by DIP switches on the I/O modules or software) to determine whether an address match occurs. For example, assuming four I/O modules are attached to base unit 200 then four address segments will match the addresses of the four I/O modules. Respective outputs of block 236 are coupled to respective inputs of OR gate 225. An output of OR gate 225 is coupled to a first input of AND gate 227. A second input of AND gate 227 receives a local configuration signal (Local_Config_Is_Input), which indicates whether a local I/O module is configured as an input.

The output of OR gate 225 is also coupled to a first input of AND gate 229. A second input of AND gate 229 receives a local configuration signal (Local_Config_Is_Output), which indicates whether a local I/O module is configured as an output. A third input of AND gate 229 receives a remote configuration signal (Remote_B_Config_Is_Input), which indicates whether a remote I/O module is providing the input. A fourth input of AND gate 229 receives the Fiber B start node signal (Fiber_B_StartNode). As is also illustrated, a control unit (SHR controller) 270 may be configured to receive various signals (e.g., Remote_A_Header_Rx, Remote_B_Header_Rx, Fiber_A_Detect, and Fiber_B_Detect) and provide various other signals (e.g., Fiber_A_Header_Tx and Fiber_B_Header_Tx).

The output of multiplexer 203 is coupled to a first input of multiplexer 241 and a first input of multiplexer 243 (see FIG. 12). The output of AND gate 207 is coupled to a select line of multiplexer 241. The output of AND gate 209 is coupled to a first select line of multiplexer 243. The output of multiplexer 223 is coupled to a first input of multiplexer 245 and a second input of multiplexer 243. The output of AND gate 227 is coupled to a select line of multiplexer 245. The output of AND gate 229 is coupled to a second select line of multiplexer 243. An output of register 238 is coupled to a third input of multiplexer 243.

Register 238 is loaded with zeroes. An output (labeled 'Input Module Data') of I/O data and configuration block (I/O Data & Local Config Input) 246 is coupled to a second input of multiplexer 241 and a second input of multiplexer 245. A first input of block 246 is coupled to an output of multiplexer 249. A second input of block 246 receives a diagnostic error (Diag. Error) signal provided by diagnostics block 260. A first output (labeled 'Local_Config_Is_Input) of block 246 indicates whether an I/O module is configured as an input module. A second output (labeled 'Local_Config_Is_Output) of block 246 indicates whether an I/O module is configured as an output module. A third output (labeled 'Local_Config_Module_Type) of block 246 indicates a type of I/O module (e.g., contact closure input module, analog input module, etc.).

A first input of multiplexer 249 is coupled to an output of module 00 register (Receive I/O Data/Config (00)) 262. A second input of multiplexer 249 is coupled to an output of module 01 register (Receive I/O Data/Config (01)) 264. A third input of multiplexer 249 is coupled to an output of module 10 register (Receive I/O Data/Config (10)) 266. A fourth input of multiplexer 249 is coupled to an output of module 11 register (Receive I/O Data/Config (11)) 268. A first select line of multiplexer 249 receives an I/O module 00 signal (00 Match A/B). A second select line of multiplexer 249 receives an I/O module 01 signal (01 Match A/B). A third select line of multiplexer 249 receives an I/O module 10 signal (10 Match A/B). A fourth select line of multiplexer 249 receives an I/O module 11 signal (11 Match A/B). Based on the state of the four select lines of multiplexer 249 the content of one of the registers 262-268 is provided at an output of multiplexer 249.

An output of multiplexer 241 is coupled to an input of buffer (FIFO) 240. An output of buffer 240 is coupled to an input of shift register (Shift Out Reg) 242. An output of register 242 is coupled to an input of encode block 244, whose output is coupled to the second fiber (Fiber B). For example, encode block 244 may perform Manchester encoding. Similarly, an output of multiplexer 245 is coupled to an input of buffer (FIFO) 250. An output of buffer 250 is coupled to an input of shift register (Shift Out Reg) 252. An output of register 252 is coupled to an input of encode block 254, whose output is coupled to the first fiber (Fiber A). For example, encode block 254 may perform Manchester encoding.

An output of multiplexer 243 is coupled to the input of an output module data block 256. An output of block 256 is coupled to an input of multiplexer 247. A first output of multiplexer 247 is coupled to an input of Send Output Data (00) register 272. A second output of multiplexer 247 is coupled to an input of Send Output Data (01) register 274. A third output of multiplexer 247 is coupled to an input of Send Output Data (10) register 276. A fourth output of multiplexer 247 is coupled to an input of Send Output Data (11) register 278. A first select line of multiplexer 247 receives an I/O module 00 signal (00 Match A/B). A second select line of multiplexer 247 receives an I/O module 01 signal (01 Match A/B). A third select line of multiplexer 247 receives an I/O module 10 signal (10 Match A/B). A fourth select line of multiplexer 247 receives an I/O module 11 signal (11 Match A/B). Based on the state of the four select lines of multiplexer 247 the input to multiplexer 247 is stored in one of registers 272-278.

Multiplexer 247 also receives inputs from port select switches for modules 00, 01, 10, and 11. The port select switches (similar to a telephone switchboard) are used to connect any input port to any output port. The port select switches are used by the output port of the addressed module. In one embodiment, each output port has an associated two-position switch. The switch setting selects input port data that is to be sent to an output port. In one embodiment, a maximum of four I/O ports are associated with each I/O module such that only a two-position switch is used for each port. In another embodiment, eight I/O ports are implemented and a three-position switch is used to select among eight switches. Hardware switches or software may be employed for the port select switches.

According to one embodiment, if a node is a start node, on every empty frame period or start pulse, the start node sends a header. In at least one embodiment, there are always two start nodes in each network (i.e., one upstream transmitter and one downstream transmitter). A start node designates itself when no signal is received by the transceivers of each node. A start node may be designated based on three conditions: the two nodes on either side of an active virtual link in a ring configuration; the two nodes on either side of a fiber break (ring or daisy-chain); and the two nodes on the end of a daisy-chain network. The start node also counts data numbers and compares the data numbers to determine if a data number is equal to an associated I/O module address setting.

If a data number is equal to an associated I/O module address setting, the start node sends node configuration (specifically, configuration information from an input module local to the connected node and not configuration information from an input module at a remote node) and data from an input module or zeroes for an output module (zeroes are also transmitted when no I/O modules are attached to a fiber optic node in which case the node becomes a repeater and retransmits data from remote nodes). If a data number is not equal to a module address setting, the start node sends zeroes. If there is a local error setting for the node (e.g., more than two input module addresses are set to a same number), the start node sends zeroes. The start node shifts out bits in the 18-bit register and determines a data counter number. In one or more embodiments, all I/O modules in a node may be checked at the same time (i.e., in parallel)). When there are two fibers with information flow in the opposite direction, the above-described flow may be used for both fibers. While in the discussion herein focuses on optical fiber transmission lines, it should be appreciated that the disclosed techniques are equally applicable to transmissions over copper wire or wireless transmissions.

According to one embodiment, if a node is not a start node, the non-start node: detects idle; reads a header; counts a data number; and compares the data number to determine if the data number is equal to an associated I/O module address setting. If the data number is equal to an associated I/O module address setting, the non-start node: reads remote node configuration from the fiber; reads a local node configuration; sends the local node configuration to the fiber for an input module; reads input data from an input module and sends the input data to the fiber; reads data from the fiber if an I/O module is an output module and sends the read data to the output module; and passes data to an adjacent next node via a fiber.

If the data number is not equal to an associated I/O module address or there is no attached module, the non-start node passes the data to the next node. If there is an error setting for the non-start node (e.g., more than two input module addresses are set the same number, mismatch, remote address setting conflict, input/no output, or output/no input) the non-start node sends zeroes. During an error condition, the non-start node sends zeroes to the local output modules (to keep output modules from acting erratically when an error occurs) and passes the fiber data through to the next node. In at least one embodiment, the shift-in register is an 18-bit register. All I/O modules at a node may be checked at the same time (i.e., in parallel). In the event of two fibers carrying information in the opposite direction, the above described flow may be used for both fibers.

A frame rate or update time of each data packet is based on: a bit rate; a total number of I/O module addresses supported by a communication system; a total number of I/O modules supported at each node of the communication system; a number of I/O device ports supported by each I/O module; and an idle time. In one embodiment, two-hundred fifty-six input addresses are implemented, with four I/O modules per node, a maximum of four device ports per I/O module, and an 11.0592 Mbps bit rate is used to create an update time or frame rate of 2.3 mS. It should be appreciated that the frame rate can be increased or decreased to support other desired update rates or frame sizes. For example, doubling the number of input addresses to 512 would also double the update time or frame rate to 4.6 mS. As another example, doubling the bit rate to 22.059 Mbps would cut the update time by one-half to 1.15 mS.

As noted above, a header (which is the first segment of each packet) is used to define when a new packet starts. In one embodiment, a segment is defined as being 18 bits in length. It should be appreciated that a length of a segment may be modified depending on the application. The header is followed by address segments in consecutive order. In one or more embodiments, a control unit of a base unit determines whether a set I/O module address (set by, for example, dual inline package (DIP) switches of the I/O module) for an I/O module corresponds to a received address segment. When the addresses match, the control unit reads the data for any output module set to the same address from each sub-segment or modifies each sub-segment from any input module set to the same address. In one embodiment, 256 input addresses are implemented to create a packet with one header and 256 address segments.

It should be appreciated that more or less than 256 addresses may be implemented in a communication system configured according to the present disclosure. In one or more embodiments, each control unit (base unit) has one channel select for each I/O module. In at least one embodiment, the base unit supports four detachable I/O modules, with each module having two or four I/O channels. It should be appreciated that more or less than four I/O modules may be associated with a base unit and that each I/O module may have more or less than four I/O channels. The base unit can, for example, be configured such that both control and I/O functions are incorporated within the base unit.

In various embodiments, to synchronize data traveling in a packet with connected I/O devices, a bit counter is employed. The bit counter is used to track when one segment ends and another segment begins. In various embodiments, there is a direct correlation between the set I/O module address and the data counter. In one embodiment, an 18-bit count is used for the header and each of five data sub-segments included in an address segment. As is illustrated in FIG. 6, each address segment may be partitioned into five data sub-segments. In this case each address segment includes 90 bits and the counter is incremented one count for the header and one count for each of the data sub-segments. In at least one embodiment, the 18-bit segment includes one start bit, sixteen data bits, and one stop bit.

The 16 bits of data are used for configuration, network status, and I/O data. I/O data in this form provides $2^{16}$ or 65,536 resolution steps per sample. In other forms, 8-bit data segments may be employed to provide $2^8$ or 256 resolution steps per sample, when less resolution is desired. An 8-bit form allows for a faster frame rate when implementing five sub-segments per address segment. In another embodiment, 24-bit data segments are implemented to provide $2^{24}$ or 16,777,216 resolution steps per sample, when greater resolution is desired. A 24-bit form limits the frame rate to a slower update rate when implementing five sub-segments per address segment, but can be compensated by increasing the bit rate. Reducing the number of input addresses from 256 also compensates for larger data segments.

In various embodiments, the first data sub-segment of each address segment is used for configuration. In one or more embodiments, data segment 1 is defined to include configuration information used to control data flow and for diagnostic purposes (fault identifiers). In other forms, the configuration segment can be used to meet other configuration and/or system status requirements. As mentioned above, the other four data segments are used for data transfer. In one embodiment, data segments 2-5 correspond to one to four I/O device channels for transferring input/output data. In this embodiment, one data segment carries 16-bits of data to/from each device. In other forms, the number of I/O channels can be expanded or contracted to meet other requirements.

In one or more embodiments, a control unit auto-identifies each I/O module by type of device, e.g., input device or output device, analog device or contact closure device. After the header, on each $5^{th}$ count (1, 6, 11, 16, etc.), the control unit begins the transfer process by first reading the configuration segment (Data Sub-segment 1). At each increment of the count (2, 3, 4, and 5), the control compares the set module address to the address segment. When an output match occurs, the control unit reads the data from the packet and transfers the data to the output device. When an input match occurs, the control unit transfers the data from the input device and writes the data to the packet. When no match occurs, the control unit acts as a repeater and transfers the data from the receive port of a first transceiver to a transmit port of a second transceiver.

In at least one embodiment, as a packet header includes sixteen bits, only three of which are utilized in a disclosed embodiment, bits are available to implement other system control functions. According to one or more aspects of the present disclosure, a single input multicast to all outputs may be employed for emergency stops. According to another aspect, a global alarm may be implemented. A system configured according to the present disclosure may employ copper, optical fiber, and/or a wireless media layer. It should be appreciated that a packet format may be modified and that a system configured according to the present disclosure may operate at a different speed, have more or less channels, and that the number of I/O addresses may be greater than or less than those disclosed (e.g., 4 to 8 or 16 bit addresses may be employed). In at least one embodiment, a head-end aggregator digital interface may be implemented with PAC/PLC and/or discrete I/O modules.

Figure 13:
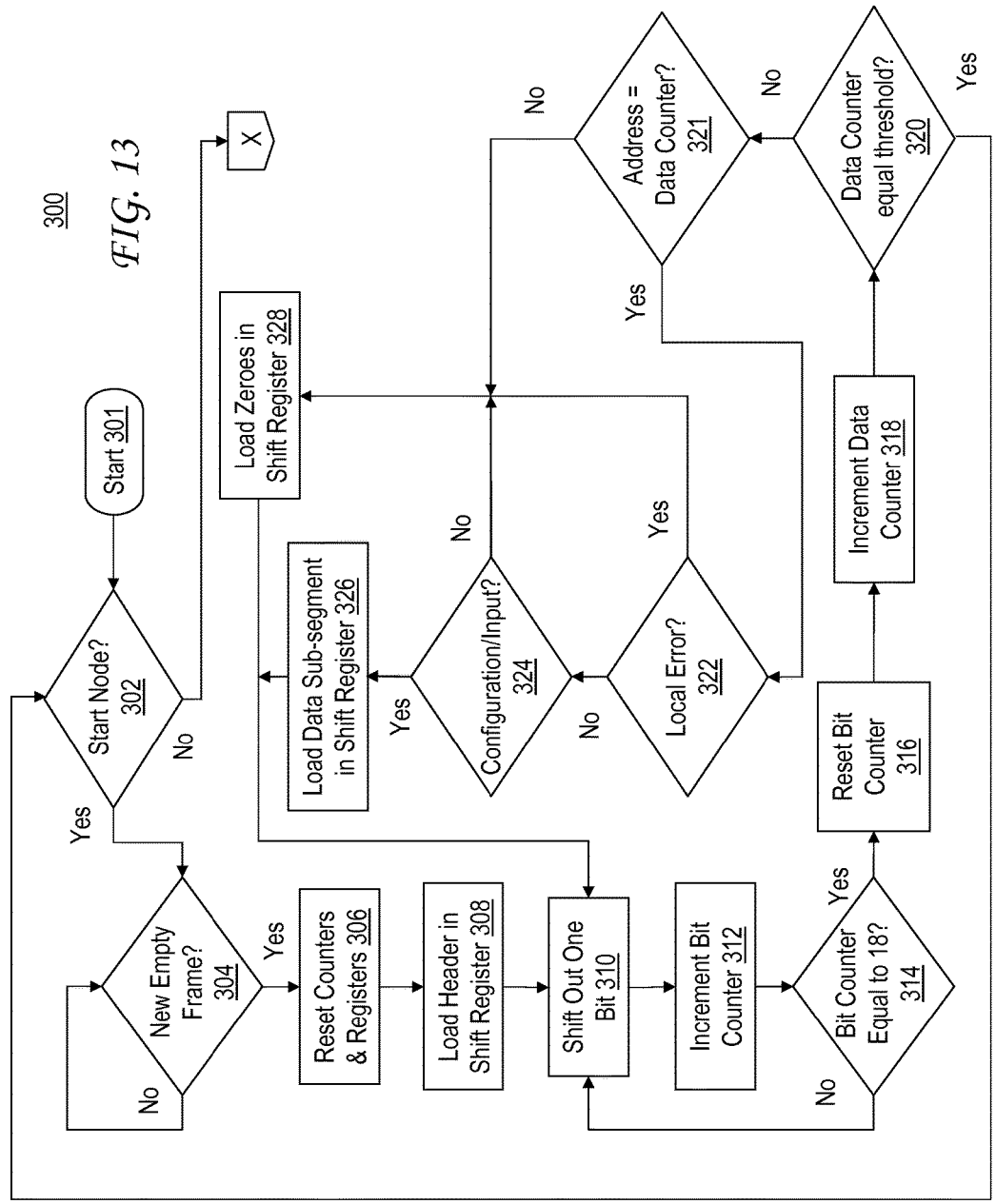
FIGS. 13-15 depict a flowchart of an exemplary process for handling packet frames according to an embodiment of the present disclosure.
Figure 14:
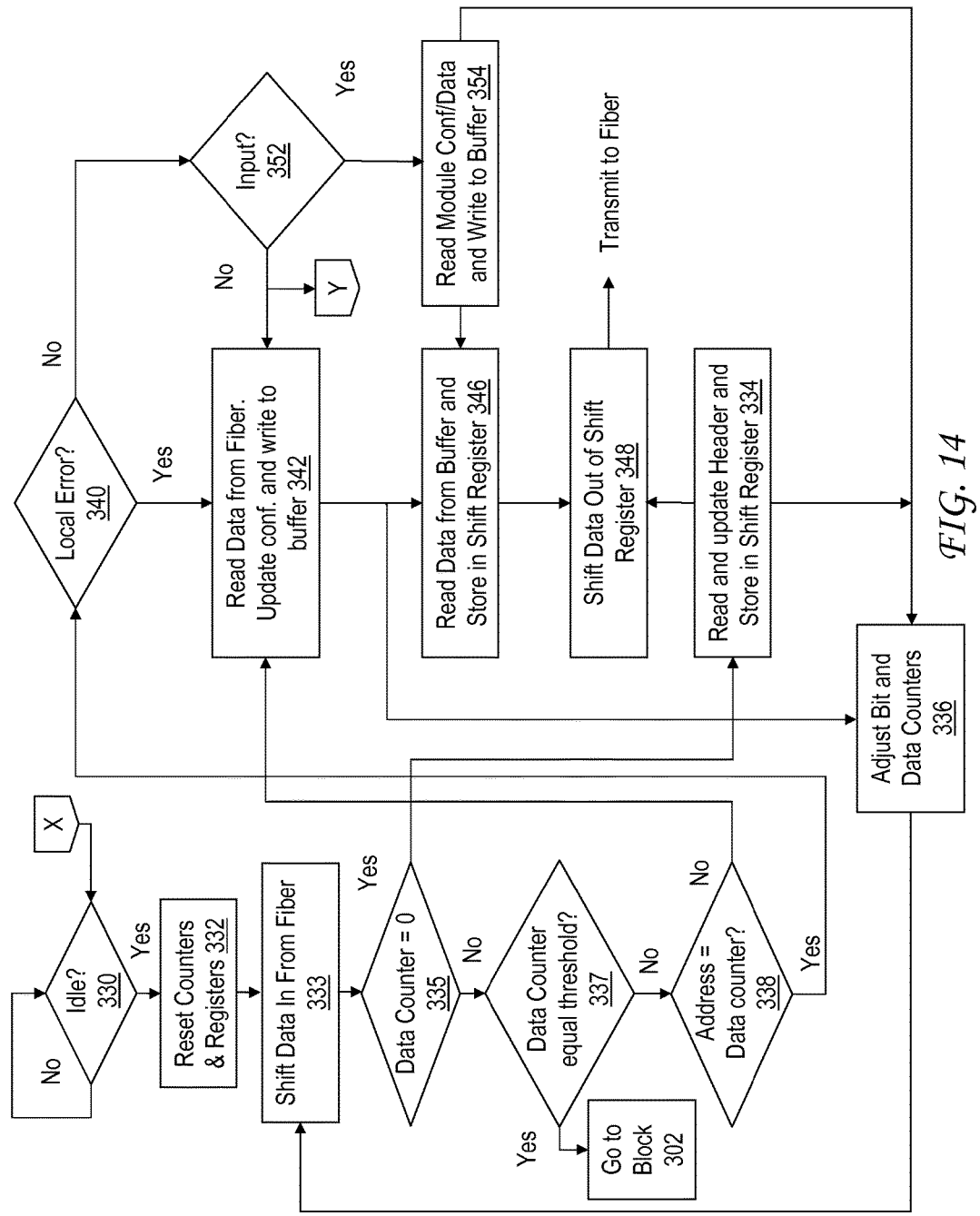
Figure 15:
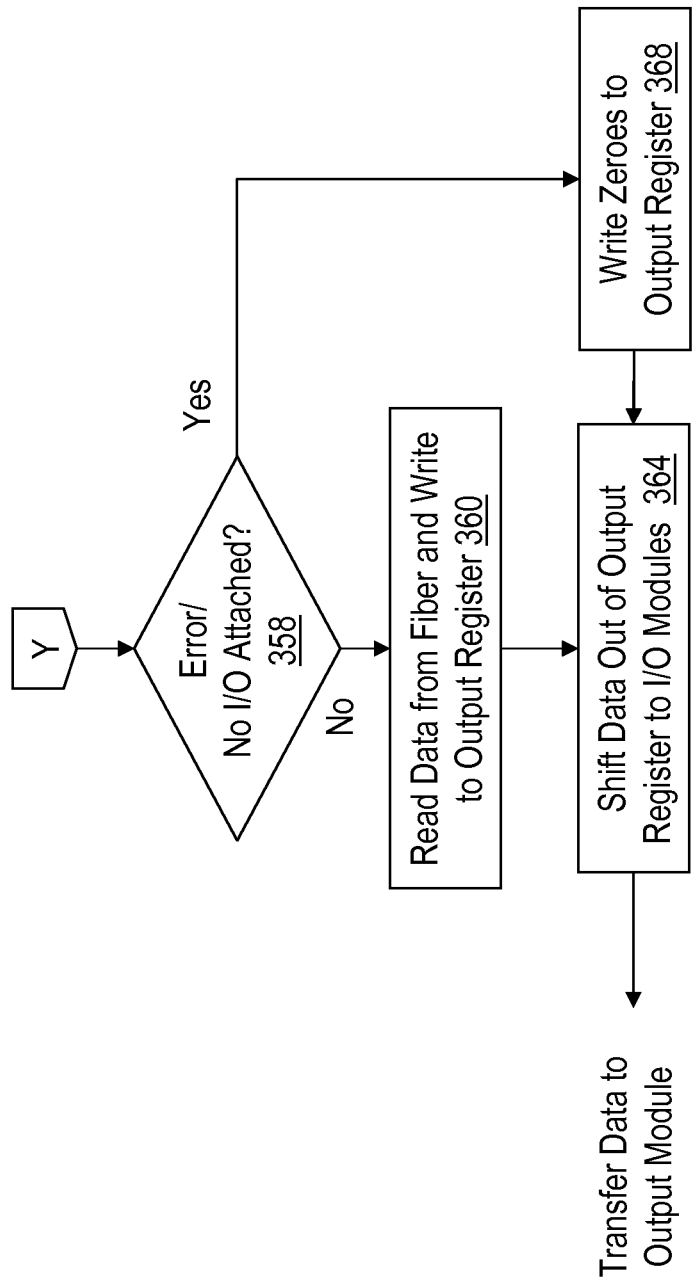

With reference to FIGS. 13-15, an exemplary process 300 for handling frames by a base unit 200 of a communication system, configured according to an embodiment of the present disclosure, is illustrated. In block 301 process 300 is initiated, e.g., in response to base units 200 of a communication system powering up. Next, in decision block 302, each of base units 200 in the communication system determine whether they are a start node or a non-start node. In response to a base unit 200 determining it is a start node, control transfers from block 302 to decision block 304. In block 304 base unit 200 determines whether a new empty frame or start pulse is indicated. In one embodiment, a new empty frame starts every 2.3 mS with a '0' to '1' transition for one bit. If a new empty frame is not indicated in block 304, control loops on block 304. If a new empty frame is indicated in block 304, control transfers to block 306, where base unit 200 resets counters (e.g., counter 214 and counter 234) and registers (e.g., Shift Out Reg 242 and Shift Out Reg 252).

Next, in block 308, base unit 200 loads a header in a shift register (e.g., Shift Out Reg 242 or Shift Out Reg 252). Then, in block 310, one bit of the header is shifted out of the shift register. Next, in block 312, a bit counter (e.g., counter 214 or counter 234) is incremented. Then, in decision block 314, a determination is made as to whether the bit counter is equal to eighteen. If the bit counter is not equal to eighteen in block 314, control transfers to block 310. If the bit counter is equal to eighteen in block 314, control transfers to block 316, where base unit 200 resets the bit counter. Next, in block 318, base unit 200 increments a data counter. Then, in decision block 320, base unit 200 determines whether the data counter is equal to a threshold (e.g., 1281). In response to the data counter being equal to the threshold in decision block 320 control transfers to block 302.

In response to the data counter not being equal to the threshold in decision block 320 control transfers to decision block 321, where base unit 200 determines whether an address of an associated I/O module is equal to the data counter (or more specifically, indicated by the data counter). If an address is equal to the data counter control transfers from block 321 to decision block 322, where base unit 200 determines whether a local error has occurred (i.e., two input modules having the same address at a node). If a local error is indicated in block 322 control transfers to block 328, where zeroes are loaded in the shift register, and control then transfers to block 310.

If an address is not equal to the data counter in block 321 control also transfers to decision block 328. If a local error is not indicated in block 322 control transfers to block 324. In block 324 base unit 200 determines whether configuration or input data is indicated for an associated I/O module. If configuration or input data is not indicated for an associated I/O module in block 324 control transfers to block 328. If configuration or input data is indicated for an associated I/O module in block 324 control transfers to block 326. In block 326 configuration or input data (i.e., a data sub-segment) is loaded into the shift register and control transfers to block 310.

In general, if a node is a start node, on every frame period, the start node sends a header. The start node also counts data numbers and compares the data numbers to associated I/O module address settings to determine if a data number is equal to an associated I/O module address setting. If a data number is equal to an associated I/O module address setting, the start node sends node configuration and data from an input module or zeroes for an output module. If a data number is not equal to an associated I/O module address setting, the start node sends zeroes. If there is a local error setting for the node (e.g., more than two input module addresses are set to a same number), the start node sends zeroes in an associated address segment.

In response to base unit 200 determining it is a non-start node in block 302 control transfers to decision block 330 (see FIG. 14). In block 330 base unit 200 determines whether idle is indicated. If idle is not indicated in block 330 control loops on block 330. If idle is indicated in block 330 control transfers to block 332, where base unit 200 resets counters (e.g., counter 214 or counter 234) and registers (e.g., Shift Out Reg 242 or Shift Out Reg 252). Then in block 333 data is shifted in from the fiber and control transfers to decision block 335. If the data counter equals zero the data segment is the header for the packet and control is transferred to block 334. Then, in block 334, base unit 200 reads a frame header, updates the header with information from the local node, and then stores the updated header in a shift register (e.g., Shift Out Reg 242 or Shift Out Reg 252).

Next, in block 348, base unit 200 initiates shifting the data out of the shift register to the fiber. From block 334 control also transfers to block 336. In block 336, base unit 200 adjusts bit and data counters for synchronization and transfers control back to block 333 to shift in the next data segment from the fiber. When the data counter does not equal zero in block 335 control transfers to decision block 337, where base unit 200 determines whether the data counter is equal to the threshold. In response to the data counter being equal to the threshold, control returns from block 337 to block 302. In response to the data counter not being equal to the threshold, control transfers from block 337 to decision block 338. In block 338, base unit 200 determines whether an associated address is equal to the data counter. If an associated address is equal to the data counter, control transfers to decision block 340 where base unit 200 determines whether a local error has occurred.

In response to a local error being indicated in block 340, control transfers to block 342. If an associated address is not equal to the data counter in block 338, control transfers to decision block 342. In block 342 base unit 200 reads data from a fiber (Fiber A or Fiber B), updates configuration information and writes the data to a buffer (e.g., FIFO 240 or FIFO 250). From block 342 control transfers to block 346, where base unit 200 reads the data from the buffer and stores the data in a shift register. Next, in block 348, base unit 200 shifts the data out of the shift register for transmission on the fiber. Control is also transferred from block 342 to block 336, where the bit and data counters are adjusted and control then transfers back to block 333 to shift the next data segment in from the fiber.

In response to no local error in block 340, control transfers to block 352. In block 352 base unit 200 determines whether the I/O module is an input module. If the I/O module is not an input module control transfers from block 352 to block 358 (see FIG. 15). Control also transfers from block 352 to block 342 when the I/O module is not an input module. That is, the local node transfers the data to the local output module that shares the address (block 358), but also transfers the data to be passed along to remote nodes that may also have output modules that match the same input address (block 342). If the I/O module is an input module control transfers from block 352 to block 354. In block 354 base unit 200 reads configuration information from both input and output modules and reads data from input modules and writes the configuration information (and data read from input modules, if applicable) to a buffer (e.g., FIFO 240 or FIFO 250). Next, control transfers from block 354 to block 346, which was discussed previously. Control is also transferred from block 354 to block 336, which adjusts the bit and data counters. Control then transfers from block 336 to block 333 to shift the next data segment in from the fiber.

If the I/O module is not an input module (i.e., the module is an output module) in block 352, control also transfers from block 352 to block 358 (see FIG. 15). In block 358 base unit 200 determines whether an error has occurred or whether there is no I/O module attached to base unit 200. In response to an error or no I/O module is attached to base unit 200 in block 358, control transfers to block 368 where base unit 200 writes zeroes to an output register (e.g., Send Output Data (00) 272, Send Output Data (01) 274, Send Output Data (10) 276, or Send Output Data (11) 278). In response to an error not occurring and one or more I/O modules being attached to base unit 200 in block 358, control transfers to block 360, where base unit 200 reads data from a fiber and writes the data to an appropriate output register. Next, in block 364, base unit 200 shifts data out of the output register to the I/O module.

In general, if a node is not a start node, the non-start node: detects idle; reads a header; counts a data number; and compares the data number to determine if the data number is equal to an associated I/O module address setting. If the data number is equal to an associated I/O module address setting, the non-start node: reads remote node configuration from the fiber; reads a local node configuration; updates a configuration segment (i.e., combines local and remote errors in configuration); sends the updated configuration to the fiber; reads input data from an input module and sends the input data to the fiber; reads data from the fiber if the I/O module is an output module and sends the read data to the output module; passes data to an adjacent next node via the fiber; and passes data to an adjacent node via the fiber when the data number is not equal to an associated I/O address setting. If there is an error setting (i.e., a remote or local error) for the non-start node (e.g., more than two input module addresses are set the same number, mismatch, remote address setting conflict, input/no output or output/no input) the non-start node sends zeroes to output modules and passes the data on the fiber to the next node.

Accordingly, techniques have been disclosed herein that advantageously facilitate improved communication between nodes of a communication system.

As will be appreciated, the processes in various embodiments of the present invention may be implemented using any combination of executed software, firmware or hardware. As a preparatory step to practicing the invention in software, code (whether software or firmware) according to a preferred embodiment will typically be stored in one or more machine readable storage mediums such as semiconductor memories such as read-only memories (ROMs) such as NVMs, programmable ROMs (PROMs), etc., thereby making an article of manufacture in accordance with the invention. The article of manufacture containing the code is used by either executing the code directly from the storage device or by copying the code from the storage device into another storage device such as a random access memory (RAM), etc. An apparatus for practicing the techniques of the present disclosure could be one or more communication devices.

Although the invention is described herein with reference to specific embodiments, various modifications and changes can be made without departing from the scope of the present invention as set forth in the claims below. For example, the techniques disclosed herein are generally broadly applicable to systems that facilitate data communication. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of operating a communication system that includes multiple nodes, comprising:
   determining, by a control unit of a specific node, whether the specific node of the communication system is a start node;

in response to determining the specific node is the start node, initiating, by the control unit, transmission of a header over a communication link of the communication system for each frame period, wherein each frame period also includes a plurality of address segments each of which has an associated data number;

in response to determining the specific node is the start node, comparing, by the control unit, data numbers for address segments with associated I/O module address settings to determine if a data number is equal to one of the associated I/O module address settings; and in response to determining the data number is equal to one of the associated I/O module address settings, initiating transmission, by the control unit, node configuration and data from an input module included in associated I/O modules or zeroes for an output module included in the associated I/O modules.

2. The method of claim 1, further comprising:
in response to determining the data number is not equal to one of the associated I/O module address settings, initiating transmission of zeroes in an address segment associated with the data number.

3. The method of claim 1, further comprising:
in response to detecting a local error for one of the data numbers, initiating transmission of zeroes in an address segment associated with the data number.

4. The method of claim 3, wherein the local error is indicated by two or more input module addresses for an I/O module being set to a same number.

5. The method of claim 1, further comprising:
in response to the specific node not being the start node, attempting to detect an idle signal;
in response to detecting the idle signal, reading the header and initiating counting of the data number;
determining if the data number is equal to an associated I/O module address setting; and
in response to the data number being equal to the associated I/O module address setting, reading remote node configuration, reading a local node configuration, updating a configuration segment, initiating transmission of the updated configuration segment, reading input data from an input module, initiating transmission of the input data, and transmitting received data to an output module.

6. The method of claim 5, further comprising:
in response to the data number not being equal to one of the associated I/O module addresses, passing the received data to an adjacent node.

7. The method of claim 6, further comprising:
in response to a local error for the non-start node, passing the received data to the adjacent node.

8. The method of claim 7, wherein the local error corresponds to two input module addresses being set to a same number.

9. A communication system, comprising:
one or more non-start nodes; and
a start node in communication with the one or more non-start nodes, wherein the start node includes a control unit configured to:
initiate transmission of a header over a communication link of the communication system for each frame period, wherein each frame period also includes a plurality of address segments each of which has an associated data number;
in response to determining the specific node is the start node, compare data numbers for address segments with associated I/O module address settings to determine if a data number is equal to one of the associated I/O module address settings; and in response to determining the data number is equal to one of the associated I/O module address settings, initiate transmission of node configuration and data from an input module included in associated I/O modules or zeroes for an output module included in the associated I/O modules.

10. The system of claim 9, wherein the control unit is further configured to:
in response to determining the data number is not equal to one of the associated I/O module address settings, initiate transmission of zeroes in an address segment associated with the data number.

11. The system of claim 9, wherein the control unit is further configured to:
in response to detecting a local error for one of the data numbers, initiate transmission of zeroes in an address segment associated with the data number.

12. The system of claim 11, wherein the local error is indicated by two or more input module addresses for an I/O module being set to a same number.

13. The system of claim 9, wherein the non-start nodes are configured to:
attempt to detect an idle signal;
in response to detecting the idle signal, read the header and initiate counting of the data number;
determining if the data number is equal to an associated I/O module address setting; and
in response to the data number being equal to the associated I/O module address setting, read remote node configuration, read a local node configuration, updates a configuration segment, initiate transmission of the updated configuration segment, read input data from an input module, initiate transmission of the input data, and transmit received data to an output module.

14. The system of claim 13, wherein the non-start nodes are further configured to:
in response to the data number not being equal to one of the associated I/O module addresses, pass the received data to an adjacent node.

15. The system of claim 14, wherein the non-start nodes are further configured to:
in response to a local error for the non-start node, pass the received data to the adjacent node.

16. The system of claim 15, wherein the local error corresponds to two input module addresses being set to a same number.

17. A method of operating a communication system that includes multiple nodes, comprising:
determining, by a control unit of a specific node, whether the specific node of the communication system is a non-start node;
in response to the specific node being the non-start node, attempting to detect, by the control unit, an idle signal;
in response to detecting the idle signal, reading a header and initiating counting of a data number by the control unit;
determining, by the control unit, if the data number is equal to an associated I/O module address setting; and
in response to the data number being equal to the associated I/O module address setting, reading remote node configuration, reading a local node configuration, updating a configuration segment, initiating transmission of the updated configuration segment, reading input data from an input module, initiating transmission of the input data, and transmitting received data to an output module by the control unit.

18. The method of claim 17, further comprising:
in response to the data number not being equal to one of the associated I/O module addresses, passing the received data to an adjacent node.

19. The method of claim 18, further comprising:
in response to a local error for the non-start node, passing the received data to the adjacent node.

20. The method of claim 19, wherein the local error corresponds to two input module addresses being set to a same number.

* * * * *